United States Patent [19]

Nutting

[11] Patent Number: 4,660,091
[45] Date of Patent: Apr. 21, 1987

[54] EXPOSURE LEVEL CORRECTION FOR FILM-TO-VIDEO CONVERSION

[75] Inventor: Thomas C. Nutting, Fairport, N.Y.

[73] Assignee: Eastman Kodak Company, Rochester, N.Y.

[21] Appl. No.: 776,539

[22] Filed: Sep. 16, 1985

[51] Int. Cl.$^4$ ............................................ H04N 5/253
[52] U.S. Cl. .................................. 358/214; 358/227; 358/228; 355/68; 356/221; 356/233; 250/214 AL; 250/214 C
[58] Field of Search ................. 358/208, 54, 214, 213, 358/225, 227, 228, 221, 280, 282, 302, 160, 161; 355/40, 56, 68, 75, 36; 356/221, 225, 233; 250/214 B, 214 C, 214 AL, 214 P

[56] References Cited

U.S. PATENT DOCUMENTS

| | | | |
|---|---|---|---|
| 2,049,384 | 7/1936 | Hogan | 358/214 |
| 2,361,255 | 10/1944 | Zworykin | 358/148 |
| 3,257,506 | 6/1966 | Stepmann | 358/160 |
| 3,421,817 | 1/1969 | Schwardt | 355/36 |
| 3,674,365 | 7/1972 | Kohler et al. | 355/40 |
| 3,723,649 | 3/1973 | Pitegoff | 358/280 |
| 3,806,645 | 4/1974 | Faureau | 358/214 |
| 3,972,613 | 8/1976 | Plumadore | 355/75 |
| 4,218,133 | 9/1980 | Bierdermann | 355/56 |
| 4,236,817 | 12/1980 | Hofstetter | 355/68 |
| 4,252,436 | 2/1981 | Kogane | 355/75 |
| 4,396,951 | 8/1983 | Tanaka | 358/228 |
| 4,399,466 | 8/1983 | Stephenson | 358/228 |
| 4,409,620 | 11/1983 | Enomoto | 358/228 |
| 4,455,574 | 6/1984 | Hashimoto et al. | 358/213 |
| 4,482,924 | 11/1984 | Brownstein | 358/302 |
| 4,485,406 | 11/1984 | Brownstein | 358/227 |
| 4,492,980 | 1/1985 | Harada | 358/213 |
| 4,495,516 | 1/1985 | Moore et al. | 358/54 |
| 4,506,300 | 3/1985 | Fearnside | 358/225 |

Primary Examiner—L. T. Hix
Assistant Examiner—D. Rutledge
Attorney, Agent, or Firm—David M. Woods

[57] ABSTRACT

The average video level of a video camera is corrected for film-to-video conversion by having a film aperture plate with a light-passing opening that is slightly enlarged with respect to the image area of the film. Non-image light passes through a peripheral region of the film, as defined by the enlarged opening, and strikes a part of the camera sensor not receiving image-wise illumination. By enlarging the aperture plate opening just enough that the video signal from the non-imaged part of the sensor approximates a desired average video level, the automatic video level correction performed by the camera will pertain only to the image. The aperture plate is part of a film gate that is rotatably mounted so that the film may be supported in either a "horizontal" or "vertical" orientation, depending on how the film image was initially exposed.

6 Claims, 6 Drawing Figures

EXPOSURE LEVEL CORRECTION FOR FILM-TO-VIDEO CONVERSION

BACKGROUND OF THE INVENTION

1. Field of the Invention

This invention relates to apparatus for establishing an average level for a video signal generated by a video camera.

BRIEF DESCRIPTION OF THE DRAWINGS

The prior art and the invention will be described with reference to the drawings, in which.

Description Relative to the Prior Art

A typical video camera includes an automatic exposure control system for maintaining the video signal produced by the camera within an acceptable range . . . acceptable in the sense that a normal change in the brightness of a sensed scene will not cause a video reproduction to be excessively over- or under-exposed. Traditional cameras rely on an average video level of the whole scene to control an aperture of a lens system, and thereby to control the exposure level. The video signal derived from the scene is averaged and compared to a reference video level that experience shows will allow enough latitude for the full range of expected scene brightness. If the average video level is too high, the lens aperture is closed down until the averaged video signal reaches the reference level. If too small, the aperture is opened up until the reference level is obtained.

There are times when a conventional video camera is used to photograph a framed image on a film transparency. If the frame is rectangular, as with a 35 mm film transparency, there are commonly two ways in which the subject matter of the image is oriented with respect to the longer axis of the film frame: the subject matter can generally align with the longer axis (the film image is then said to be oriented "horizontally") or it can be rotated approximately 90° relative to the longer axis (the film image is then said to be oriented "vertically"). It all depends on how the 35 mm camera was held at the time of exposure. The "vertical" orientation presents a problem in transferring the photographic image to a video form since a "vertical" image will appear tipped on its side on a video display unless something is done to "right" it at the transfer stage. For example, in U.S. Pat. No. 4,485,406, the image sensor is carried on a rotary stage that can rotate 90° about its optical axis to accommodate a "vertically" oriented picture. Alternatively, a rotatable dove prism may be disposed in the optical path to rotate the image of the film with respect to the sensor. Either approach, however, requires a specially designed video camera.

Figure 1B:
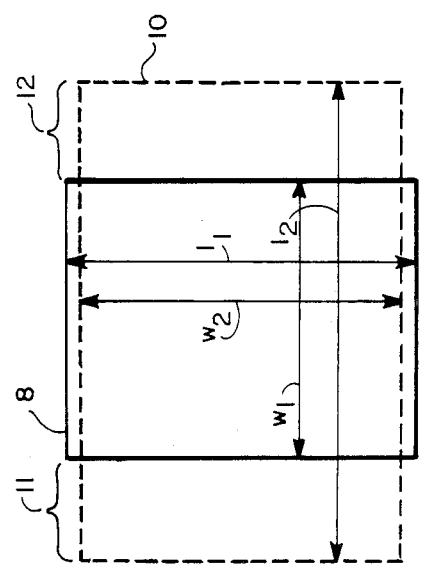
FIGS. 1A and 1B are views illustrative of the prior art in which a transparency is imaged horizontally and vertically with respect to an image sensor.
Figure 1A:
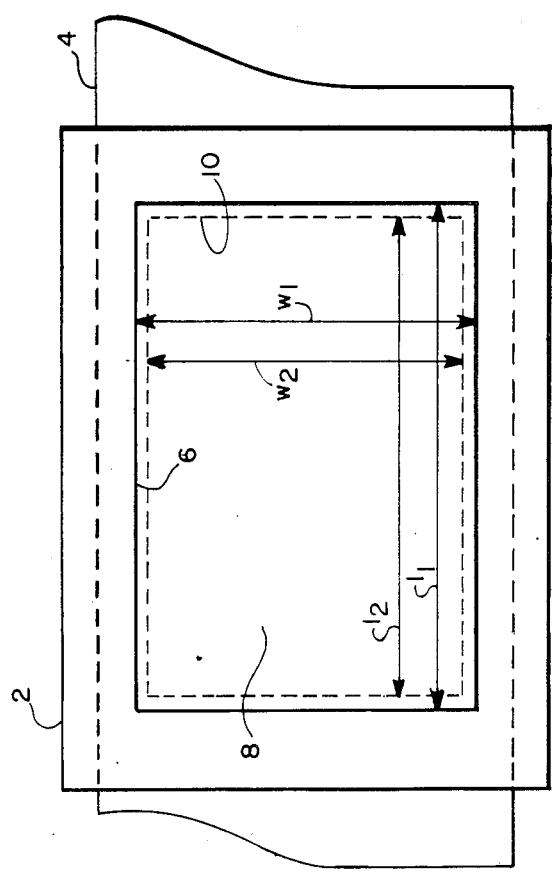

Another problem with "vertically" oriented pictures concerns the active image area of the sensor: if the full area of the sensor is used for one film orientation . . . say, horizontal, which occurs most frequently . . . then, by rotating the sensor (or the film image), the other orientation will cast an image that occupies a lesser area of the sensor. This will affect any procedure that depends on the whole image area, such as the determination of the average video level. FIGS 1A and 1B illustrate the problem. In FIG. 1A, an aperture plate 2 overlays a filmstrip 4 such that an opening 6 in the aperture plate 2 generally coincides with edges of a negative film frame 8. The frame 8 is imaged upon an image sensor 10 (shown by broken line) by an optical system (not shown). As shown by FIG. 1A, the projected image of the frame 8 is shown in relation to the sensor area which receives light coming through the actual film frame 8 (i.e., the sensor is much smaller than the actual frame 8). The length $l_1$, and the width $w_1$, of the imaged film frame 8 generally correspond to the length $l_2$ and width $w_2$ of the sensor 10. The active image area of the sensor 10 is thus practically its full area.

If the film frame 8 is rotated 90° to accommodate a "vertically" oriented exposure, then the condition in FIG. 1B is obtained, which shows the relative position of the rotated, imaged film frame 8 on the sensor 10. The optical system has "shrunk" the imaged film frame 8 so that the length $l_1$ fills the width $w_2$ of the sensor 10; now, however, the width $w_1$ of the imaged film frame 8 falls short of occupying the length $l_2$ of the sensor 10. In this orientation the sensor 10 includes outlying areas 11 and 12 which are shadowed by the aperture plate 2 and thus receive no illumination. This will cause borders to appear on the reproduced picture. More importantly, the average video level for the picture will be incorrect. The conventional camera circuit takes into account the full area of the sensor in calculating an average video level for the scene. The outlying areas 11 and 12 of the image sensor in FIG. 1B, however, do not have any scene information to process. The camera circuit will "see" no exposure for these areas and determine that the average video level is too low (i.e., the overall scene is over exposed and the negative is too dark). Then the diaphragm will be opened to let in more light. The result: the "vertically" oriented 35 mm negative will be over-exposed; thus the reproduction will be excessively dark.

In a typical video camera, the only way to correct the video level for "problem" exposures is to modify the internal circuitry of the camera. In other words, a special camera must be designed to address this problem. It would be more attractive . . . from the standpoint of cost and complexity . . . to have some way of accommodating a "vertically" oriented exposure without necessitating extensive camera modification.

SUMMARY OF THE INVENTION

The invention treats the problem of exposure level adjustment in a "vertical" orientation by providing a specially designed aperture plate that "tricks" the camera into making the necessary video level accommodation for the unexposed outlying areas. By locating the problem-solving improvement in the external aperture plate that supports the film, a conventional video camera can be used for "vertically" oriented exposures without necessitating internal modification of the camera.

In practicing the invention, an original, such as a film transparency, is so supported in a path of illumination that image-wise illumination reaches a partial area of an image sensor in the camera. A further (outlying) area of the sensor is thus unexposed to image-wise illumination. Instead of blocking all non-image illumination from striking the outlying area, the improvement is obtained by allowing some illumination to get through. For this purpose, only so much of this area is illuminated with non-image illumination as will approximate a predetermined average video level from the whole outlying area. Exposure level adjustment then becomes mainly a function of the imaged area of the sensor alone.

A specially-provided aperture plate is the preferred way of controlling the illumination. The aperture plate has an opening according to the invention that restricts the passing illumination to two parts: A first part is modulated image-wise by passage through the supported original and strikes the partial area of the sensor. A second part passes outboard of the original without receiving image-wise modulation and strikes part of the outlying area of the sensor. The expanded aperture plate opening is especially sized so that it passes non-image illumination typically through the unexposed border area of the film and its perforations.

DETAILED DESCRIPTION OF A PREFERRED EMBODIMENT

Since video cameras are well known, the present description will be directed in particular to elements forming part of, or cooperating more directly with, the present invention. Elements of a video camera, including optical and circuit elements, not specifically shown or described herein may be selected from those known in the art.

Figure 2:
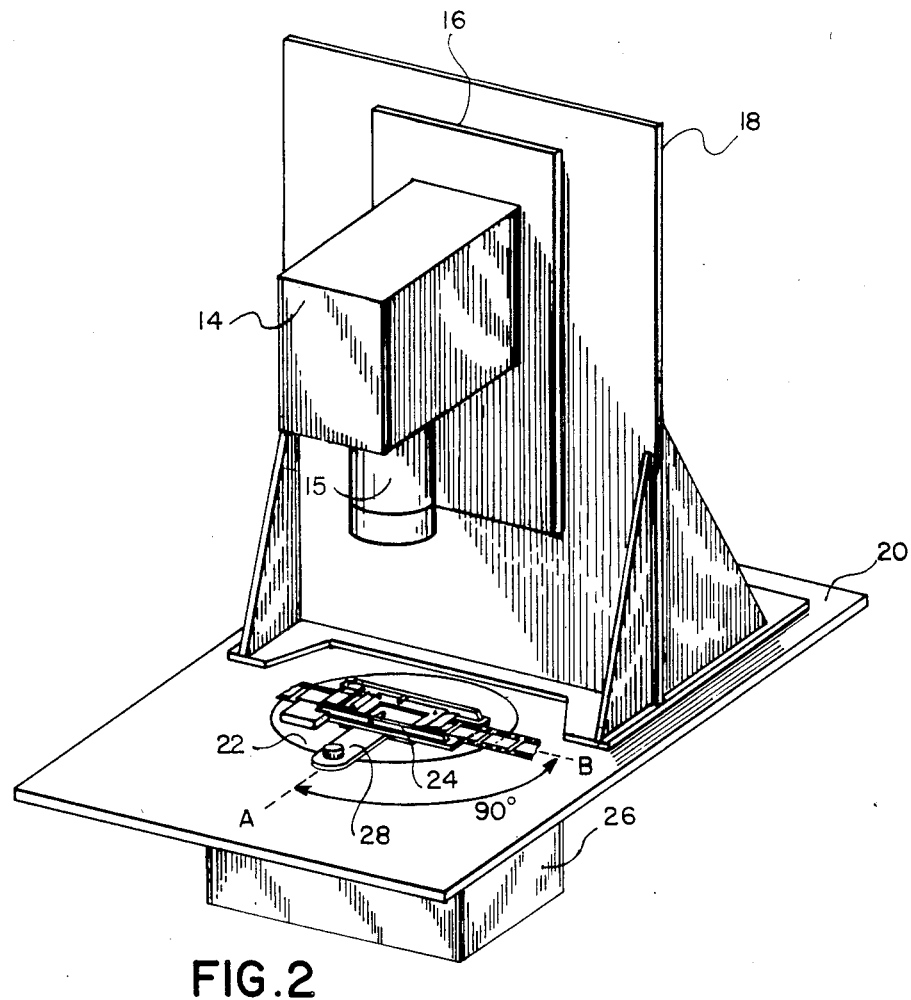
FIG. 2 shows a perspective view of a video camera mounted with respect to a rotatable film gate according to the invention.

FIG. 2 shows the basic aspects of a film-to-video transfer station affording improved control of the average video level according to the invention. A conventional video camera 14 is mounted, for example, by its tripod socket to an adjustable mounting plate 16. The mounting plate 16 is attached to a frame member 18, which in turn is mounted on a base plate 20. A section of the base plate 20 is removed so as to receive a rotatable turret 22 centered along the optical axis of the camera 14 and its lens 15. An aperture plate 24 holds the filmstrip 4 in place relative to the optical axis. Light from an illuminator 26 passes through an aperture (not shown) in the turret 22 and then through the filmstrip 4 and the lens 15 to a photosensor in the camera 14. The turret 22, which is supported for rotation relative to the base plate 20, is manually movable from a radial position A to a radial position B by sliding a turret handle 28 between the two positions. As shown by FIG. 2, the filmstrip 4 is in a "horizontal" orientation in which the turret handle 28 is aligned with the position A. By rotating the turret 22 by 90° and aligning the turret handle with the position B, the filmstrip 4 is placed in a "vertical" orientation.

Figure 3:
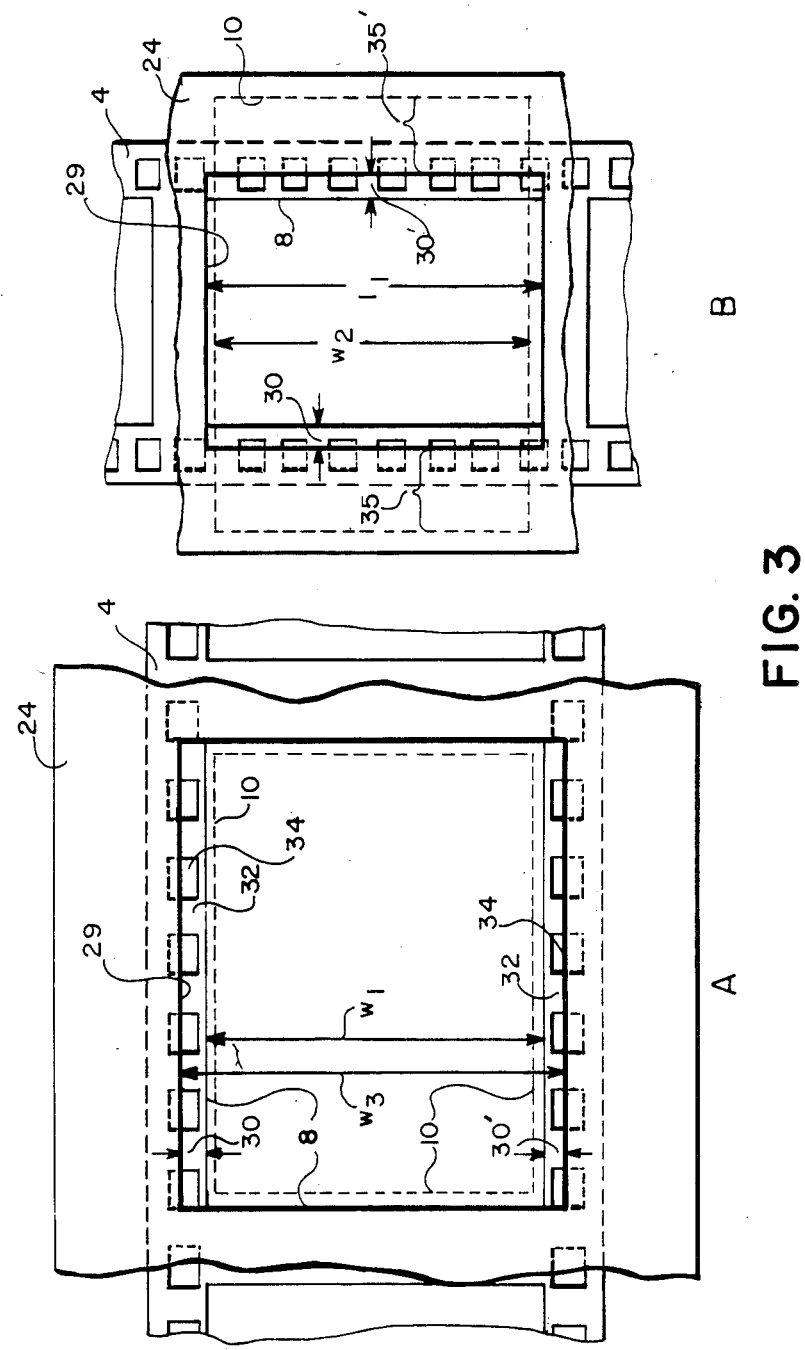
FIGS. 3A and 3B are views of a transparency and an overlying aperture plate, included in the film gate of FIG. 2, shown horizontally and vertically with respect to the image sensor.

As better seen by FIGS. 3A and 3B, the aperture plate 24 has an aperture opening 29 of width $w_3$ that is greater than the corresponding width $w_1$ of the image frame 8 on the filmstrip 4. The enlarged width $w_3$ includes two like regions 30 and 30' which include transparent border areas 32 and perforations 34 on the filmstrip 4. In the "horizontal" orientation depicted in FIG. 3A, the area of the image frame 8 is slightly larger than the projected area of the sensor 10. (The respective reference characters 8 and 10 are connected by lead lines to the respective borders of the film frame and the sensor). All photosites of the sensor 10 are therefore exposed to image-wise illumination and light passing through the outlying border regions 30 and 30' do not reach, and therefore do not affect, the sensor 10.

When the turret 22 is rotated to its "vertical" orientation, as depicted in FIG. 3B, the image frame 8 no longer occupies the full area of the sensor 10. (The aperture plate 24 and the filmstrip 4 are seen in FIG. 3B to appear smaller than their representation in FIG. 3A; this happens because the area of the sensor 10 is kept the same in both illustrations but the magnification ratio has been changed in FIG. 3B in order that the length $l_1$ of the frame 8 corresponds to the width $w_2$ of the sensor 10). It is important to note that, in the "vertical" orientation of FIG. 3B, image-wise illumination coming through the frame 8 strikes only a part of the full area of the sensor 10. Non-image illumination passes through the border areas 30 and 30' and strikes another part of the sensor 10. Finally, the sections 35 and 35' of the aperture plate 24 shadow further outlying parts of the sensor 10 and prevent any light from reaching such parts.

Figure 4:
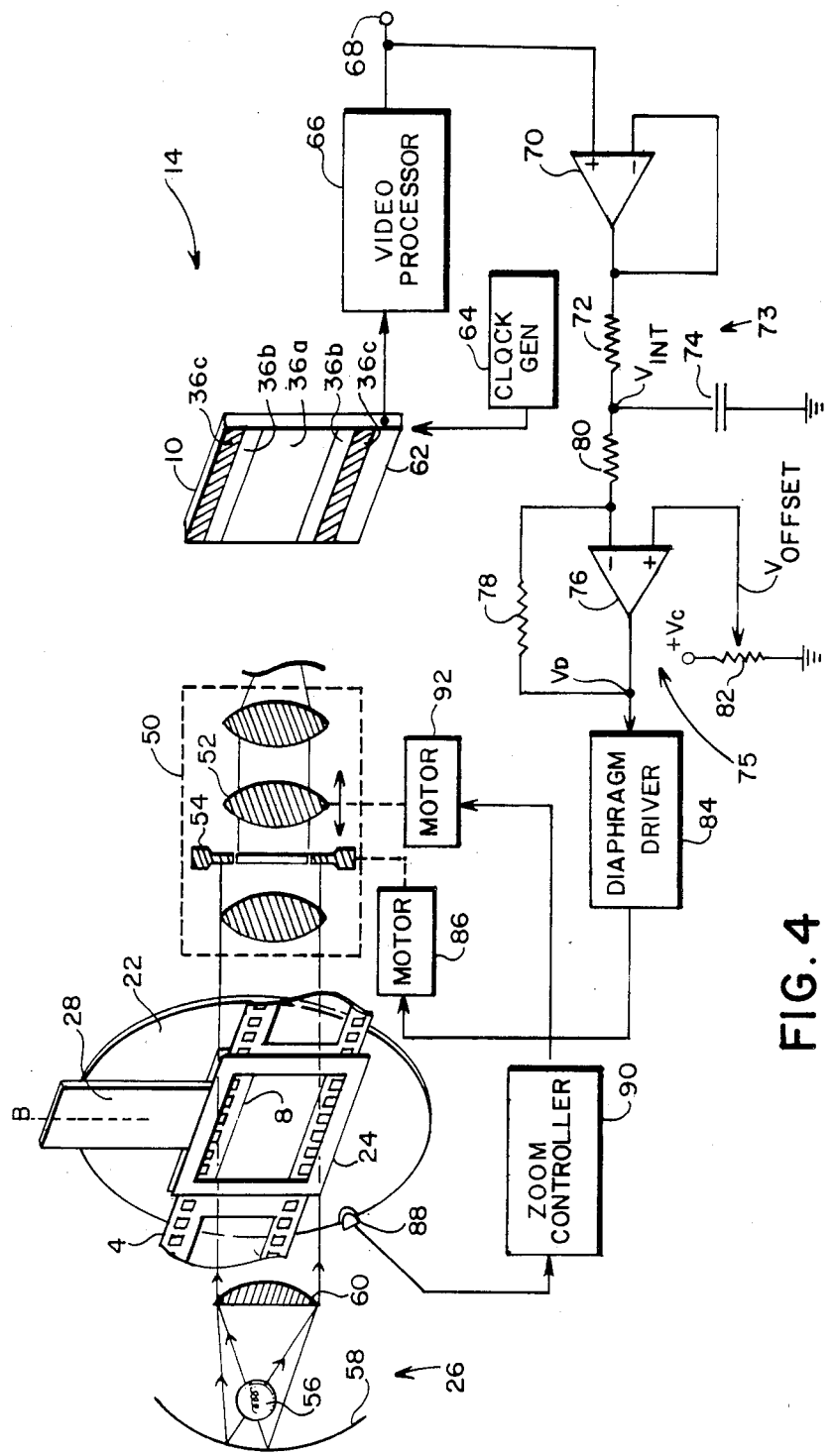
FIG. 4 is a schematic diagram of the video camera showing the video signal averaging circuit and cooperative external components, expecially the aperture plate, arranged to generate a desired average signal level according to the invention.

Referring now to FIG. 4, the turret 22 is shown in a "vertical" orientation such that the turret handle 28 aligns with the radial position B. The video signal is influenced by what happens in three regions of the sensor 10. In a central region 36a, the sensor 10 receives image-wise illumination from the image area of the image frame 8. In the regions 36b outboard of the central region 36a, the image sensor receives image-wise illumination from the border regions 30 and 30' on the filmstrip (see FIG. 3B). Still further outboard from the central region 36a in the regions 36c, the image sensor 12 is shadowed by the aperture plate 22 and receives no illumination. As will be described in detail, the video signal for the entire area of the sensor 10 is averaged and compared to a reference signal. If these signals differ, the light passing to the sensor 10 is adjusted until the averaged signal equates with the reference signal. In the "vertical" orientation shown by FIG. 3B, the averaged value will include signal contributions from the shadowed region 36c (see FIG. 4), where the signal is essentially zero, the border region 36b and the central region 36c. Nonetheless, it is desirable that the averaged video signal represents mainly the average value for the central region 36a receiving the image-wise radiation. The signals from the other regions 36b and 36c should exhibit little influence on the average. This is done by forcing the signal components from the non-image regions 36b and 36c to approximate a desired video level. Enough of the combined regions 36b and 36c is uncovered to illumination that the resulting signal from those regions assumes the desired video level. The enlarged width ($w_3 - w_1$) of the opening in the aperture plate 24 is empirically selected to provide the desired average level.

The video camera 14 includes a zoom lens 50 disposed with respect to the aperture plate 24, and the film frame 8 supported therewith, so as to direct an image upon the sensor 10. The zoom lens 50 includes an adjustable lens component 52 for varying the focal length of the zoom lens 50 and an adjustable diaphragm 54 for regulating the amount of light that transmits through the zoom lens 50. Both the position of the lens component 52 and the opening of the diaphragm 54 are adjusted in a conventional manner, for example, by moving external rings on the barrel of the zoom lens 50. The illuminator 26 includes a light source 56 for generating the illuminating light. The illuminating light is concentrated in the direction of the aperture plate 24 by a mirror 58 and a condensor lens 60.

Though it is shown as a two-dimensional solid state image sensor, the sensor 10 is meant to generally represent a conventional photosensor system, including the common three-tube system found in a conventional color video camera. (The regions 36a, b and c would then relate to any one tube, or all three tubes.) The sensor 10 generates an array of charge-based signals corresponding to the brightness of the light striking it. It also includes a register 62 for collecting the charge-based signals prior to their transfer off the sensor. The sensor is driven in a known manner by a clock signal generated by a clock generator 64. The sensor output is sent to a video processor 66, which produces a standard color video signal in a known manner and provides it to a circuit output terminal 68.

The processed video signal is also supplied to an operational amplifier 70 connected as a voltage follower. The output signal from the voltage follower amplifier 70 is applied to an integrator 73 comprising a resistor 72 and a capacitor 74. The integrator 73 averages the video signal from the full area of the sensor 10, providing a voltage $V_{INT}$. That is, the integrated voltage includes, for the "vertical" orientation of the film frame 8, the image-wise signal from the region 36a, the border signal from the regions 36b and the essentially zero signal from the shadowed regions 36c. The intergrated signal $V_{INT}$ is provided to an inverting circuit 75 including an operational amplifier 76, a feedback resistor 78, and an input resistor 80. An offset voltage $V_{OFFSET}$ is provided to the non-inverting input terminal of the amplifier 76 from a potentiometer 82, which divides down a fixed positive voltage $V_c$. The voltage $V_{OFFSET}$ constitutes a reference that determines the average video level for the camera. A diaphragm control voltage $V_D$ is generated at the output of the operational amplifier 76 as follows $$V_D = V_{OFFSET} - V_{INT}(R_{78}/R_{80})$$

where $R_{78}$ and $R_{80}$ are resistances of the respective resistors 78 and 80. This relationship indicates that a totally dark scene will provide a positive voltage $V_D$, where $$V_D = V_{OFFSET}$$

since $V_{INT}$ is substantially zero; conversely, the offset voltage $V_{OFFSET}$ and the resistors 78 and 80 are selected so that a totally blank scene (i.e., the film frame 8 is completely transparent) will provide a sizable negative voltage.

The control voltage $V_D$ is provided to a driver circuit 84 for driving a motor 86 that gears with the external ring (not shown) controlling the diaphragm 54. A positive voltage $V_D$ will cause the shaft of the motor 86 to rotate in a direction that opens the diaphragm and lets more light through to the sensor 10 . . . since a positive voltage $V_D$ indicates too little exposure. Conversely, a negative voltage $V_D$ will cause the motor 86 to rotate oppositely and close down the diaphragm, allowing less light through to the sensor 10 . . . since a negative voltage $V_D$ indicates too much light on the sensor 10. When the integrated voltage $V_{INT}$, as multiplied by its gain factor, equals the offset voltage $V_{OFFSET}$ then the correct average video level has been attained and the diaphragm needs no further adjustment for the given frame 8. When a new frame is moved into the aperture gate 24, the whole procedure will be repeated until the correct average is again found.

Assume now that the aperture plate 28 is positioned as shown by FIG. 3A since the image on the film frame 8 is "horizontally" oriented. The image-wise illumination from the frame 8 thus fills the whole sensor 10. The next frame is then positioned under the aperture plate 24. This frame, it is assumed, has a "vertically" oriented image. The turret 22 is therefore rotated 90° until the turret handle 28 aligns relative to position B. A switch 88 (see FIG. 4) locates in a notch on the edge of the turret 22 and accordingly signals a zoom controller 90 that the magnification ratio must be changed. A motor 92 is driven to move the adjustable lens element 52 and thereby reduce the imaged length $l_1$ of the frame 8 until it fits within the width $W_2$ of the sensor 10 (see FIG. 3B). (This adjustment could also be made by manually turning the external ring controlling the lens component 52.) Because a significant portion of the sensor 20 receives no image-wise illumination, the light-admitting aperture 29 is just wide enough that the charge-based signals from the non-imaged portion (regions 36b and 36c) provide a video signal having the desired average video level. Then, for an average scene in a "vertical" orientation, the video level correction provided by the integrator 73 and the inverting circuit 75 will reflect the scene content of the film frame alone. If the scene is not representative of an average brightness level, then the automatic correction afforded by the widened aperture will bring the camera nearly to a correct average video level. (An additional manual adjustment of the diaphragm may be desirable in this case. Alternatively, the potentiometer 82 . . . which is normally preset and not further touched . . . could be brought out to a control panel of the camera as a contrast adjustment and made adjustable within an accepatable range.)

Figure 5:
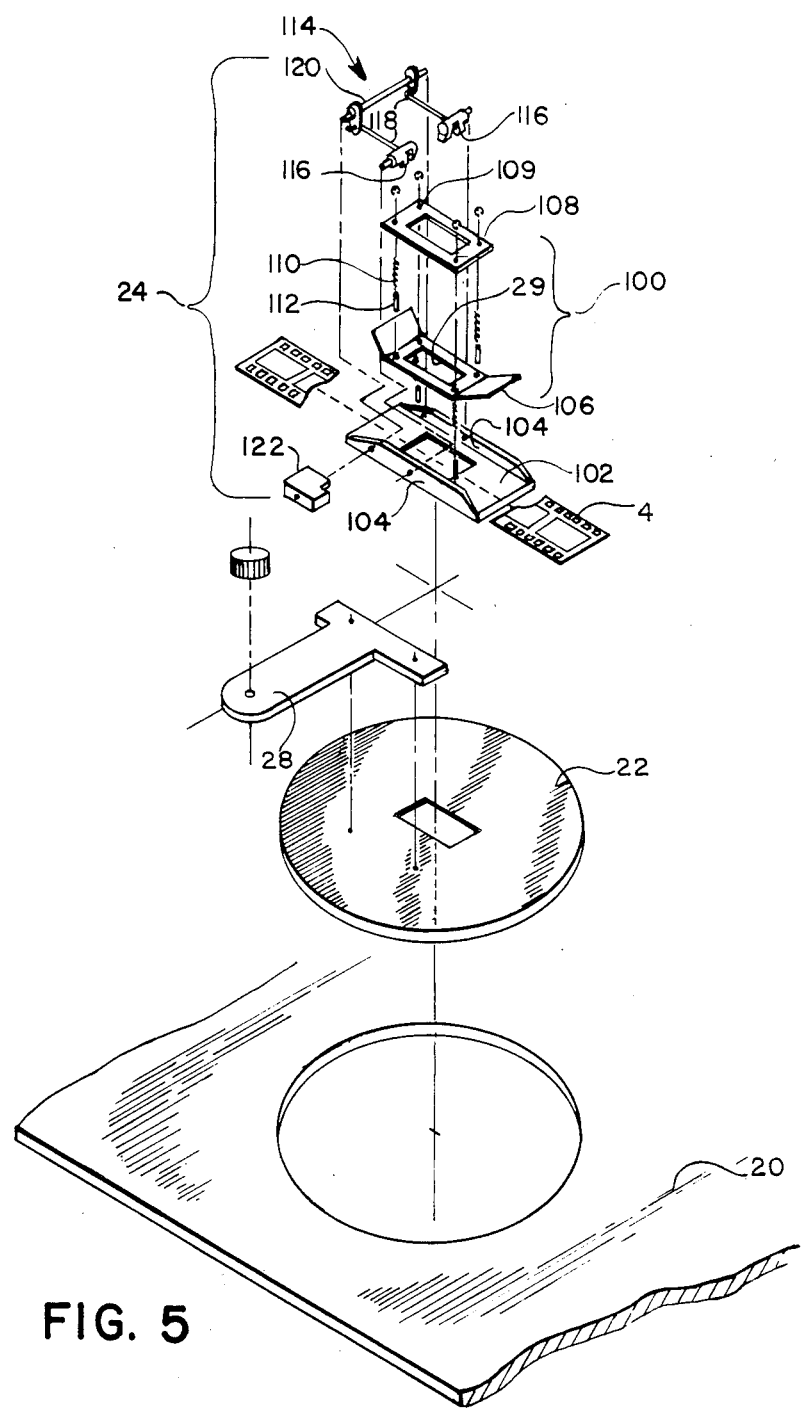
FIG 5 is an exploded view of the rotatable film gate shown partially in FIG. 2.

FIG. 5 is an exploded view of the turret 22 showing in particular that the aperture plate 24 includes an upper film gate 100 and a lower film gate 102. The channel-like lower film gate 102 includes uplifted edges 104 for guiding the filmstrip 4. The upper film gate 100 includes a pressure plate 106 and a down-thrusted camming plate 108. The aforementioned enlarged aperture 29 is in the pressure plate 106. The camming plate 108 is resiliently separated from the pressure plate 106 by a set of springs 110 coiled about a set of spacers 112. The camming plate 108 forces the pressure plate 106 against the lower film gate 102 by the action of a camming assembly 114. The assembly 114 includes a pair of cams 116 mounted for rotation on shafts extending from the uplifted edges 104 of the lower film gate 102. Each cam 116 is joined by a connecting rod 118 to a cross-member 120. The whole cam assembly is moved by turning a film release handle 122 connected to the cross-member 120. The filmstrip 4 is placed between the lower film gate 102 and the pressure plate 106. When the film release handle 122 is pressed down, the cams 116 slide across the top camming surface of the camming plate 108, forcing it and the underlying pressure plate 106 toward the lower film gate 102 until the filmstrip 4 is snugly in place.

The invention has been described in detail with particular reference to a presently preferred embodiment, but it will be understood that variations and modifications can be effected within the spirit and scope of the invention. It is clear, for example, that a positive transparency can be used in place of a negative transparency or with suitable modifications, especially to the illuminator, a reflection print could be used in place of a transparency.

What is claimed is:

1. Apparatus for maintaining a predetermined video level for a video signal that is derived from an image sensor receiving image-wise illumination from an original only over a partial area of the sensor, a further area of the sensor being unexposed to image-wise illumination but nonetheless contributing to the output video signal, said apparatus comprising:
   means for supporting the original in the path of the illumination directed toward the sensor such that the image-wise illumination reaches the partial area of the sensor; and
   means for illuminating at least a part of the further area of the sensor with non-image illumination, the illuminated part of the further area being so selected that the further area generates a video signal that approximates the predetermined video level.

2. Apparatus as claimed in claim 1 in which said supporting means includes an aperture through which the image-wise illumination passes and said illuminating means comprises an expanded opening along at least a portion of the peripheral wall of said aperture for passing non-image illumination to at least part of the further area of the sensor.

3. Apparatus for establishing an average video level for a video signal that is derived from illumination striking an image sensor, the sensor receiving image-wise illumination over a part of its area from an original, a further area of the sensor being unexposed to image-wise illumination but nonetheless contributing to the output video signal, said apparatus comprising:
   means for regulating the intensity of the illumination that reaches the sensor;
   means for generating an average video signal from the video signal derived from the image sensor;
   means for adjusting said regulating means until the average video signal reaches a predetermined level;
   means for supporting the original in the path of the illumination directed toward the sensor;
   means defining an aperture for restricting the illumination striking the sensor to two parts: a first part constituting image-wise illumination that transmits through the original to the sensor and a second part constituting non-image illumination that strikes enough of the further area of the sensor that the video signal derived from the further area approximates said predetermined average video level.

4. Apparatus as claimed in claim 3 wherein said means defining an aperture comprises an aperture plate having an opened area that is larger than the image area defined by the periphery of the original.

5. Apparatus for establishing an average video level for a video signal that is derived from illumination striking an image sensor, the sensor receiving image-wise illumination from a film transparency capable of more than one orientation relative to the imaging area of the sensor, in one of such orientations the film transparency casting an image only upon a partial area of the sensor, a further area of the sensor in that case being unexposed to illumination from the image area of the film transparency but nonetheless contributing to the output video signal, said apparatus comprising:
   an adjustable diaphragm for regulating the intensity of the illumination that reaches the sensor;
   means for generating an average video signal from the output video signal derived from the sensor;
   means for adjusting said diaphragm until the average video signal reaches a predetermined level;
   a rotatable support for positioning the film transparency in the path of the illumination directed toward the sensor;
   means for rotating said support such that the transparency may be placed in a vertical orientation in which it casts an image upon a partial area of the sensor; and
   an aperture plate for restricting light through the film transparency to one part transmitting through an image area of the transparency and to a second part transmitting through a non-image border area of the transparency, said second part of the transmitted light thereupon striking at least part of the further area of the sensor unexposed to image illumination when said rotating means places the transparency in said vertical orientation, whereby the further area generates a video signal that approximates the predetermined average video level.

6. Apparatus for use with a video camera to provide a corrected average video level when a frame of film is imaged upon a partial area of an image sensor in the camera, another area of the sensor thus remaining unexposed to the image but still affecting the average video level established by the camera, said apparatus comprising:
   means for supporting the frame of film in the optical path of the camera; and
   means defining an aperture in the supporting means within which the frame is located, said aperture having an enlarged area that extends outwardly of at least a portion of the periphery of the frame so as to permit non-image illumination to enter the camera and to reach enough of the unexposed area of the sensor that the video signal obtained therefrom approximates a predetermined average video level.

* * * * *